April 17, 1962 R. A. BRAUNBERGER 3,030,125
LOCKS FOR SLIDING FIFTH WHEEL TRUNNIONS
Filed Feb. 27, 1961 2 Sheets-Sheet 1

INVENTOR.
RAY A. BRAUNBERGER
BY
Attorney

April 17, 1962   R. A. BRAUNBERGER   3,030,125
LOCKS FOR SLIDING FIFTH WHEEL TRUNNIONS
Filed Feb. 27, 1961   2 Sheets-Sheet 2

INVENTOR.
RAY A. BRAUNBERGER
BY
Attorney

United States Patent Office 3,030,125
Patented Apr. 17, 1962

3,030,125
LOCKS FOR SLIDING FIFTH WHEEL
TRUNNIONS
Ray A. Braunberger, 221 N. La Salle St., Chicago, Ill.
Filed Feb. 27, 1961, Ser. No. 91,733
5 Claims. (Cl. 280—407)

The invention relates to axially adjustable fifth wheels that are carried on the platform of a tractor. The invention provides means for moving the fifth wheel to a desired position on its supporting rails by backing the tractor carrying the fifth wheel up to a stationary semi-trailer without damage to the fifth wheel and for locking the fifth wheel in the desired position along its rails.

When the position of the fifth wheel on its rails is to be changed, plungers locking the trunnions of the fifth wheel to the rails are first removed. A plunger is then inserted in one of the number of equally spaced holes in each rail, the hole being selected so that when the trunnion is moved into contact with the plunger, the fifth wheel will be in the desired position. The tractor carrying the fifth wheel is then backed under a stationary semi-trailer which engages the fifth wheel. As the tractor continues to move, the fifth wheel slides along the rails until one end of each trunnion engages a plunger that has been placed in the rail. An additional plunger is then placed in the rail near the other end of the trunnion to prevent the trunnion from moving away from the initially contacted plunger.

The invention provides means for elevating the forward end of the semi-trailer if it is too low to pass over the fifth wheel without injury to the fifth wheel or the semi-trailer.

The object of the invention is to provide means that permit the selection of a desired position of a fifth wheel axially adjustable along rails and to hold the fifth wheel in that position once it has been moved into it.

Another object is to provide engaging means between the trunnion and the rails, effective when the trunnion locking means are disengaged to prevent the trunnion from lifting off the rails.

Still another object of the invention is to provide a single fluid actuated cylinder that is connected to a plunger entering a hole in one rail while the piston is connected to a plunger entering a hole in the other rail.

Figure 1:
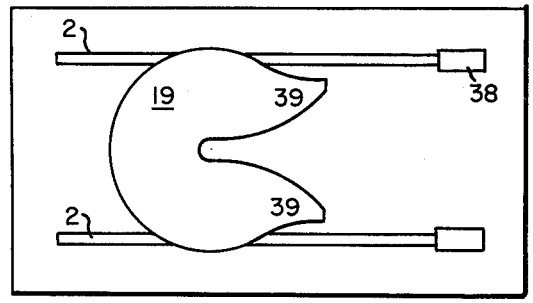
FIGURE 1 shows a top view of an axially adjustable fifth wheel mounted on parallel rails carried by the platform of a semi-trailer that embraces the invention.
Figure 2:
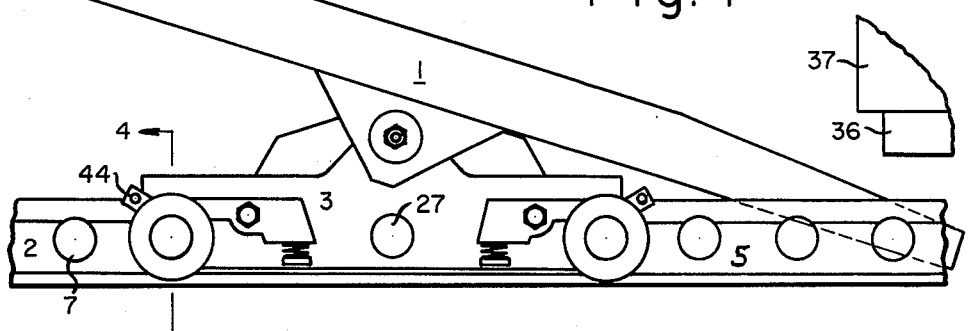
FIGURE 2 is an elevation of the fifth wheel shown in FIGURE 1, drawn to a larger scale.
Figures 4, 6:
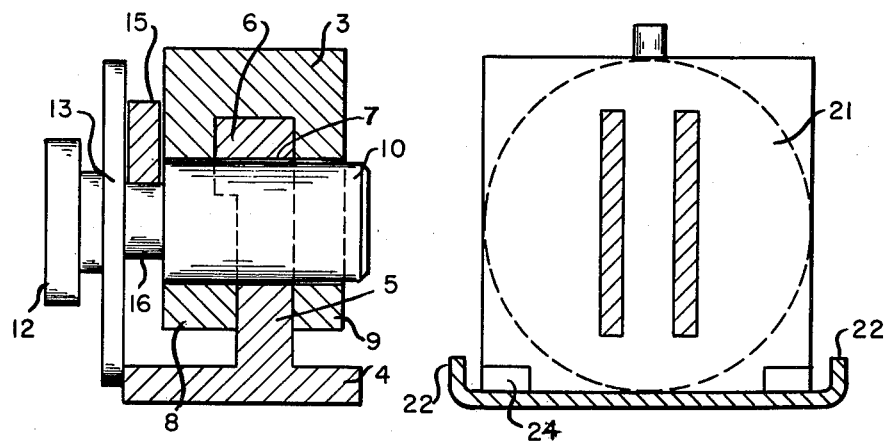
FIGURE 4 shows a section thru one trunnion along line 4—4 in FIGURE 2, drawn to an enlarged scale.
FIGURE 6 is a section along lines 6—6 in FIGURE 5, drawn to an enlarged scale.

Referring more particularly to FIGURE 1, 19 indicates a fifth wheel movable along rails 2. Referring to FIGURE 2, it will be seen that the fifth wheel plate 1 is mounted on trunnions 3 that can slide on rails 2. Each rail, shown in section in FIGURE 4, has a base section 4, a vertical portion 5 and a laterally extending head 6. Equally spaced along the rail are holes 7 extending thru the vertical portion 5. The trunnion 3, as shown in FIGURE 4, has vertical portions 8 and 9 that embrace the two sides of the rail and the vertical portion 8 extends under the head 6 of the rail so that the trunnion cannot lift vertically off the rail as the equipment is subjected to road shocks.

Figure 3:
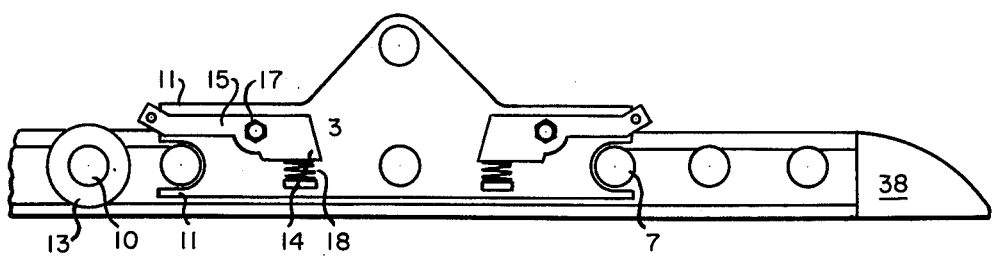
FIGURE 3 shows the trunnion of the fifth wheel shown in FIGURE 2, ready to be moved along the rails into contact with plungers inserted in the rail.

Plungers 10 can be manually inserted in a selected hole 7 in the rail. As shown in FIGURE 3, the trunnion 3 has, at each end, fingers 11 that pass above and below a plunger 10 that has been inserted in the rail when the trunnion is moved toward the left in FIGURE 3. The plunger 10 may have a hand grasp 12 and a stop plate 13 that engages the edge of the rail base 4 to locate the plunger in its axial position. Hinged on the trunnion is a locking lever 14 whose finger 15 passes into a groove 16 in the plunger 10. Thus, when the trunnion in FIGURE 3 is moved toward the left, the stop plate 13 assures that the plunger 10 is in the proper position for finger 15 to enter groove 16 in the plunger. The plunger is now locked in axial direction and cannot fall out while the semi-trailer is moving along the road. To remove the plunger, the locking lever 14 must be rocked about its axis 17. A spring 18 forces finger 15 down into groove 16. To remove the plunger, the knob 44 at the end of finger 15 must be lifted by the operator.

After the trunnion has engaged the plunger in FIGURE 3, a second plunger is inserted in a hole 7 at the other end of the trunnion, as shown in FIGURE 2, to prevent the trunnion from moving out of the selected position relative to the rail.

In a modified form of the invention, after the first plunger has been inserted manually in the proper hole 7 and the trunnion has been moved along the rail into contact with plunger, a second plunger carried by the trunnion is inserted by fluid pressure in a hole 7 in the rail to lock the trunnion in place. In the preferred form of the modified invention shown in FIGURE 5, a single cylinder actuated by fluid pressure moves a plunger 25 or 26 into a hole 7 in each one of the two rails.

Figure 5:
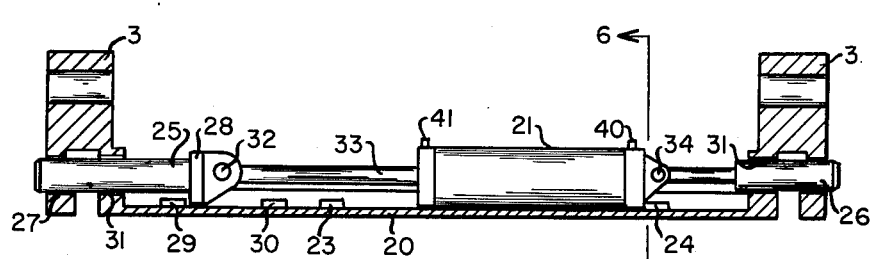
FIGURE 5 shows the fluid actuated means for moving the plungers into place used in a modified form of the invention drawn to a larger scale than FIGURE 1.

In this form of the invention, shown in FIGURES 5 and 6, a platform generally indicated at 20 is attached to the two trunnions 3. As shown in FIGURE 6, the platform has a channel section so that the cylinder 21 can slide along the center of the platform, guided by the vertical flanges 22 of the platform. Stops 23, 24 limit the movement of the cylinder. Two plungers 25, 26 are respectively adapted to enter a hole 7 in each of the two rails. Each plunger also passes thru holes 27, 31 in the trunnion, thus locking the trunnion to the rail in the selected position. Attached to the plunger 25 is an end piece 28 that also slides on the platform 20 and is guided by the flanges 22. Stops 29 and 30 on the platform limit the motion of the plunger 25 from the position shown in FIGURE 5 to that in which the plunger is still guided in hole 31 of the trunnion 3 but is clear of the rail 2. Plunger 25 is pinned at 32 to the piston rod 33 extending out of cylinder 21. Hinged to the other end of cylinder 21 at 34 is the other plunger 26.

The cylinder is shown in contact with stop 24 when the plunger 26 extends thru the holes 31 and 27 in the trunnion and stop 23 is so placed that if the cylinder 21 is moved along the platform into contact with stop 23 the plunger will extend only thru hole 31 of the trunnion.

Fluid pressure can be applied, such as by a hose not shown, to orifice 40 in the cylinder to hold the plungers 25, 26 in the position shown. If fluid pressure is applied to orifice 41 instead of orifice 40, the cylinder will move into contact with stop 23 to draw the plunger 26 out of the hole 7 in one rail while the end piece 28 of the other plunger will be drawn into contact with stop 30 and plunger 27 will move out of hole 7 in that rail.

Referring to FIGURE 2, the plate 36 on the underside of a semi-trailer 37 may be below the level at which it will ultimately rest on the fifth wheel plate when the semi-trailer and the fifth wheel are connected together. To avoid injuring the fifth wheel, its trunnions, or trunnion locks when coupling the tractor to a semi-trailer, the fifth wheel plate is designed so that its aprons 39 will hang below the tops of the rail when the fifth wheel is not carrying a load. The ends of the rails 2 are provided with shoes 38 as shown in FIGURES 1 and 3.

If the fifth wheel plate 36 is below the level of the top of the rail 2 when the tractor backs up to the semi-trailer, the tapered shoes will cause the end of the trailer plate to be lifted to the top of the rails.

Similarly, the aprons of the top plate will allow the trailer plate to be elevated from the rail top without placing serious strain on the trunnion locks.

I claim:

1. In a sliding fifth wheel carried by a tractor and engaging a semi-trailer, in combination, parallel rails on a tractor, a fifth wheel having trunnions slidable on said rails, a semi-trailer engaging said fifth wheel, spaced holes in said rails, a plunger manually inserted in one of said holes having a circular recess, fingers on the end of said trunnion that pass above and below said plunger when the tractor moves said rails relative to said fifth wheel until the plunger engages said trunnion, and a locking lever carried by said trunnion that enters said recess in the plunger when the trunnion engages said plunger to lock the plunger against disengagement by axial movement.

2. In a sliding fifth wheel carried by a tractor and engaging a semi-trailer, in combination, parallel rails on a tractor, a fifth wheel having trunnions slidable on said rails, a semi-trailer engaging said fifth wheel, spaced holes in said rails, a plunger manually insertable on one of said holes to determine the position of the trunnion on said rails, fingers at each end of the trunnion that pass under and over said plunger when the trunnion engages the plunger, a second plunger manually inserted at the other end of the trunnion when the trunnion has reached the desired position, annular recesses in each plunger, locking levers carried by the trunnion that enter said recesses when the trunnion is in contact with the plunger and prevent axial disengagement of the plunger and the rail.

3. A fifth wheel having, in combination, two parallel supporting rails, interconnected trunnions sliding on said rails, holes in said rails and trunnions respectively, a plunger manually insertable in said rail hole to determine the position to which the fifth wheel is to be moved, projecting fingers on said trunnion engaging said plunger when the trunnion is moved into contact with the plunger, means carried by the trunnion to lock the plunger against axial movement after it is engaged by the trunnion, power actuated plungers carried by said trunnions adapted to engage holes in each trunnion and each rail to lock the fifth wheel to the rails.

4. In a sliding fifth wheel having trunnions sliding on rails, a vertical rail web, a trunnion sliding on said rail web and having a projection extending downward from the top of the rail, a horizontal rail base supporting said web and having an edge extending parallel to said web and beyond said projection, aligned holes of substantially the same diameter in said projection, and said web, a plunger fitting into said holes, a circular flange on the plunger engaging the edge of said base when the plunger is in place, a plunger locking lever carried by the trunnion, a groove in said plunger engaged by said lever when the plunger is in place to prevent any accidental displacement.

5. In a sliding fifth wheel having trunnons slidable on rails, in combination, a first plunger adapted to connect one trunnion to one rail, a second plunger adapted to connect the other trunnion to the other rail, a platform connecting the two trunnions, a cylinder movable relative to said platform connected to said first plunger, a piston movable in said cylinder connected to said second plunger, stops on said platform limiting the extent of axial movement of said piston relative to said platform, other stops on said platform limiting the extent of axial movement of said piston relative to said platform.

References Cited in the file of this patent

UNITED STATES PATENTS

| | | |
|---|---|---|
| 2,509,459 | Stamler | May 30, 1950 |
| 2,589,678 | De Lay | Mar. 18, 1952 |
| 2,860,891 | Ramun | Nov. 18, 1958 |
| 2,903,275 | Walther | Sept. 8, 1959 |
| 2,985,463 | Geerds | May 23, 1961 |